United States Patent
Ohno et al.

(10) Patent No.: US 10,457,234 B2
(45) Date of Patent: Oct. 29, 2019

(54) VEHICLE FRONT PASSENGER SEAT AIRBAG DEVICE

(71) Applicants: TOYOTA JIDOSHA KABUSHIKI KAISHA, Toyota-shi, Aichi-ken (JP); TOYODA GOSEI CO., LTD., Kiyosu-shi, Aichi (JP)

(72) Inventors: Mitsuyoshi Ohno, Miyoshi (JP); Tatsuaki Kojima, Sunto-gun (JP); Ikuo Yamada, Kiyosu (JP); Takahiro Kojima, Kiyosu (JP); Shun Ito, Kiyosu (JP)

(73) Assignees: TOYOTA JIDOSHA KABUSHIKI KAISHA, Toyota (JP); TOYODA GOSEI CO., LTD., Aichi (JP)

( * ) Notice: Subject to any disclaimer, the term of this patent is extended or adjusted under 35 U.S.C. 154(b) by 169 days.

(21) Appl. No.: 15/697,795

(22) Filed: Sep. 7, 2017

(65) Prior Publication Data

US 2018/0065581 A1    Mar. 8, 2018

(30) Foreign Application Priority Data

Sep. 8, 2016  (JP) .................................. 2016-175995

(51) Int. Cl.
*B60R 21/0136* (2006.01)
*B60R 21/015* (2006.01)
(Continued)

(52) U.S. Cl.
CPC .......... *B60R 21/0136* (2013.01); *B60R 21/01* (2013.01); *B60R 21/01558* (2014.10);
(Continued)

(58) Field of Classification Search
CPC .......... B60R 21/0136; B60R 21/01558; B60R 21/01; B60R 21/205; B60R 21/231;
(Continued)

(56) References Cited

U.S. PATENT DOCUMENTS

2003/0006594 A1  1/2003  Bergerson et al.
2015/0105982 A1* 4/2015  Okamura ............ B60R 21/0132
                                                        701/45
(Continued)

FOREIGN PATENT DOCUMENTS

DE    10161515 A1    9/2002
EP      037225 A1    3/1990
(Continued)

*Primary Examiner* — Marthe Y Marc-Coleman
(74) *Attorney, Agent, or Firm* — Oliff PLC (57) ABSTRACT

A vehicle front passenger seat airbag device includes a plurality of inflators, an airbag, and a controller. The airbag includes a front passenger seat airbag, and a center airbag that includes a vehicle-rear-side end that projects out further toward a vehicle rear side when inflated and deployed than a rear end of the front passenger seat airbag when inflated and deployed. The controller controls timings for igniting each squib included in the plurality of inflators such that a peak internal pressure of the airbag inflated and deployed when an oblique collision or small overlap collision has occurred is delayed, compared to a peak internal pressure of the airbag inflated and deployed when a head-on collision has occurred.

12 Claims, 8 Drawing Sheets

(51) Int. Cl.
  *B60R 21/205* (2011.01)
  *B60R 21/00* (2006.01)
  *B60R 21/01* (2006.01)
  *B60R 21/231* (2011.01)

(52) U.S. Cl.
  CPC .......... *B60R 21/205* (2013.01); *B60R 21/231* (2013.01); *B60R 2021/0004* (2013.01); *B60R 2021/0009* (2013.01); *B60R 2021/01034* (2013.01); *B60R 2021/01231* (2013.01); *B60R 2021/23107* (2013.01)

(58) Field of Classification Search
  CPC .... B60R 2021/0004; B60R 2021/0009; B60R 2021/01034; B60R 2021/01231; B60R 2021/23107
  USPC ......................................................... 701/45
  See application file for complete search history.

(56) References Cited

U.S. PATENT DOCUMENTS

| | | |
|---|---|---|
| 2015/0166002 A1 | 6/2015 | Fukawatase |
| 2016/0046257 A1 | 2/2016 | Yamada et al. |
| 2017/0129439 A1 | 5/2017 | Taguchi et al. |

FOREIGN PATENT DOCUMENTS

| | | |
|---|---|---|
| JP | 2016-020104 A | 2/2016 |
| JP | 2016-20116 A | 2/2016 |
| JP | 2016-40155 A | 3/2016 |
| WO | 2016/002384 A1 | 1/2016 |

\* cited by examiner

| TIME | 0 (ms) | TTF (ms) | TTF + x (ms) | TTF + y (ms) | TTF + (x + α) (ms) | TTF + 25 (ms) | TTF (x + β) (ms) | TTF (x + α + β) (ms) | TTF + 60 (ms) |
|---|---|---|---|---|---|---|---|---|---|
| HEAD-ON COLLISION | VEHICLE COLLISION | FIRST IGNITION OF SQUIB | SECOND AND THIRD IGNITION OF SQUIBS | COMPLETION OF INFLATION AND DEPLOYMENT | — | BEGINNING OF OCCUPANT RESTRAINT | | | |
| OBLIQUE COLLISION OR SMALL OVERLAP COLLISION | VEHICLE COLLISION | FIRST IGNITION OF SQUIB | — | | SECOND IGNITION OF SQUIB | — | THIRD IGNITION OF SQUIB | COMPLETION OF INFLATION AND DEPLOYMENT | BEGINNING OF OCCUPANT RESTRAINT |

FIG.6

| TIME | 0 (ms) | TTF (ms) | TTF + x (ms) | TTF + y (ms) | TTF + (x + a) (ms) | TTF + 25 (ms) | TTF (x + b) (ms) | TTF (x + c) (ms) | TTF + 60 (ms) |
|---|---|---|---|---|---|---|---|---|---|
| HEAD-ON COLLISION | VEHICLE COLLISION | FIRST IGNITION OF SQUIB | SECOND AND THIRD IGNITION OF SQUIBS | COMPLETION OF INFLATION AND DEPLOYMENT | — | BEGINNING OF OCCUPANT RESTRAINT | — | — | — |
| OBLIQUE COLLISION OR SMALL OVERLAP COLLISION | VEHICLE COLLISION | FIRST IGNITION OF SQUIB | — | — | SECOND IGNITION OF SQUIB | — | COMPLETION OF INFLATION AND DEPLOYMENT | THIRD IGNITION OF SQUIB | BEGINNING OF OCCUPANT RESTRAINT |

FIG.7

VEHICLE FRONT PASSENGER SEAT AIRBAG DEVICE

CROSS-REFERENCE TO RELATED APPLICATION

This application is based upon and claims the priority under 35 USC 119 from Japanese Patent Application No. 2016-175995, filed on Sep. 8, 2016, the disclosure of which is incorporated by reference herein.

TECHNICAL FIELD

The present disclosure relates to a vehicle front passenger seat airbag device.

RELATED ART

A hitherto known airbag device includes a passenger bag, a center bag, and a tether belt that joins a first connecting section of the center bag and a second connecting section of the passenger bag together. In such an airbag device, the center bag is supported by the tether belt and restrains the sides of the head of an occupant (for example, International Publication (WO) No. 2016/002384).

Thus, for example, an occupant is able to be restrained in a stable posture even in an oblique collision.

In cases in which a head-on collision has occurred, it is preferable for the airbag to have a low internal pressure so as to restrain the occupant in a soft state. However, in cases in which the airbag internal pressure is set to conform to head-on collision conditions, if an oblique collision occurs, lowering the airbag internal pressure would make the airbag too soft, and it is possible that the head of the occupant would bottom out on an instrument panel. On the other hand, if the airbag internal pressure is set so as to conform to oblique collision conditions, the size of vent holes would need to be set smaller. However, in cases in which the size of the vent holes is set smaller, if a head-on collision occurs, the airbag internal pressure would be increased, making the airbag hard and thereby increasing load on the occupant.

SUMMARY

In consideration of the above circumstances, an object of the present disclosure is to provide a vehicle front passenger seat airbag device capable of restraining an occupant using an appropriate airbag internal pressure, regardless of the collision mode of a frontal collision.

A vehicle front passenger seat airbag device of a first aspect includes plural inflators each comprising a squib, an airbag, and a controller. The airbag includes a front passenger seat airbag and a center airbag. The front passenger seat airbag is inflated and deployed on receipt of gas supplied from the plural inflators, and is inflated and deployed at a vehicle front side of an occupant seated in a front passenger seat. The center airbag is inflated and deployed at a vehicle width direction center side of the front passenger seat airbag, and includes a vehicle-rear-side end that projects out further toward a vehicle rear side when inflated and deployed than a rear end of the front passenger seat airbag when inflated and deployed. The controller controls timings for igniting each squib included in the plural inflators such that a peak internal pressure of the airbag inflated and deployed when an oblique collision or small overlap collision has occurred is delayed compared to a peak internal pressure of the airbag inflated and deployed when a head-on collision has occurred.

The vehicle front passenger seat airbag device of the first aspect includes the plural inflators, and the airbag is inflated and deployed on receipt of gas supplied from the plural inflators. Specifically, the front passenger seat airbag is inflated and deployed at the vehicle front side of an occupant seated in the front passenger seat, and the center airbag is inflated and deployed at the vehicle width direction center side of the front passenger seat airbag. When the center airbag has inflated and deployed, a vehicle-rear-side end of the center airbag projects out further toward the vehicle rear side than the rear end of the front passenger seat airbag when inflated and deployed.

The controller controls timings for igniting each squib included in the plural inflators such that the peak internal pressure of the airbag inflated and deployed when an oblique collision or small overlap collision has occurred is delayed compared to the peak internal pressure of the airbag inflated and deployed when a head-on collision has occurred.

Thus, for example, the occupant is restrained by the airbag with an appropriate airbag internal pressure regardless of the collision mode. In this manner, the occupant is able to be restrained with an appropriate airbag internal pressure without setting the size of vent holes smaller and regardless of the collision mode of the frontal collision, due to the controller controlling the timings for igniting each squib such that an appropriate airbag internal pressure is achieved.

A vehicle front passenger seat airbag device of a second aspect is the first aspect of the invention, wherein the controller causes a timing for igniting at least one of the squibs ignited second or later out of the squibs included in the plural inflators to be delayed in cases in which an oblique collision or small overlap collision has occurred compared to a timing for igniting the corresponding squib in cases in which a head-on collision has occurred.

In the vehicle front passenger seat airbag device of the second aspect, the peak internal pressure of the airbag inflated and deployed when an oblique collision or small overlap collision has occurred is delayed compared to the peak internal pressure of the airbag inflated and deployed when a head-on collision has occurred. Accordingly, in cases in which an oblique collision or small overlap collision has occurred, an occupant is able to be restrained at a timing delayed compared to in cases in which a head-on collision has occurred, and the occupant is thereby able to be restrained at an appropriate timing according to the collision mode of the frontal collision.

A vehicle front passenger seat airbag device of a third aspect is the second aspect of the invention, wherein the plural inflators include a first squib, a second squib, and a third squib. Moreover, the controller causes: the second squib and the third squib to ignite substantially simultaneously, after igniting the first squib in cases in which a head-on collision has occurred, and the third squib to ignite, after sequentially igniting the first squib and then the second squib and before inflation and deployment of the airbag is completed in cases in which an oblique collision or a small overlap collision has occurred. Note that substantially simultaneously expresses belonging within a specific interval of time, and, for example, encompasses time differences of a degree permitting ignition timing offsets that occur as a result of variance in the manufactured articles.

In the vehicle front passenger seat airbag device of the third aspect, causes the third squib to ignite after sequentially igniting the first squib and then the second squib and before inflation and deployment of the airbag is completed in cases in which an oblique collision or small overlap collision has occurred. This enables an occupant to be restrained with an appropriate airbag internal pressure without delaying completion of inflation and deployment of the airbag in cases in which an oblique collision or small overlap collision has occurred.

A vehicle front passenger seat airbag device of a fourth aspect is the second aspect of the invention, wherein the plural inflators include a first squib, a second squib, and a third squib. Moreover, the controller causes the second squib and the third squib to ignite substantially simultaneously after igniting the first squib in cases in which a head-on collision has occurred, and the third squib to ignite after sequentially igniting the first squib and then the second squib and after inflation and deployment of the airbag is completed in cases in which an oblique collision or small overlap collision has occurred.

In a vehicle front passenger seat airbag device of the fourth aspect, cause the third squib to ignite after sequentially igniting the first squib and then the second squib and after inflation and deployment of the airbag is completed in cases in which an oblique collision or small overlap collision has occurred. Thus, in cases in which an oblique collision or small overlap collision has occurred, the airbag internal pressure can be raised at a timing according to the oblique collision or small overlap collision, enabling an occupant to be restrained with an appropriate airbag internal pressure. Further, it is possible to raise the airbag internal pressure at a timing according to an oblique collision or small overlap collision, enabling the degrees of freedom in design to be increased.

A vehicle front passenger seat airbag device of a fifth aspect is the second aspect of the invention, wherein the plural inflators include a first squib, a second squib, and a third squib. Moreover, in cases in which a head-on collision has occurred, the controller cause the second squib and the third squib to ignite substantially simultaneously after igniting the first squib. Moreover, in cases in which an oblique collision or small overlap collision has occurred, based on a front-rear position of a seat of an occupant or on the degree of severity of a collision, the controller switches between first control, causing the third squib to ignite after sequentially igniting the first squib and then the second squib and before inflation and deployment of the airbag is completed, and second control, causing the third squib to ignite after sequentially igniting the first squib and then the second squib and after inflation and deployment of the airbag is completed. Note that the degree of severity of a collision is, for example, the magnitude of acceleration detected by the collision sensor when the vehicle is in a collision. For example, the greater the magnitude of acceleration detected by the collision sensor when the vehicle is in a collision, the greater the degree of severity of the collision, and the smaller the magnitude of acceleration detected by the collision sensor when the vehicle is in a collision, the smaller the degree of severity of the collision.

In the vehicle front passenger seat airbag device of the fifth aspect, switching between first control and second control is based on the front-rear position of the seat of the occupant or on the degree of severity of the collision in cases in which an oblique collision or small overlap collision has occurred. This enables the occupant to be restrained with an appropriate airbag internal pressure according to the front-rear position of the seat of the occupant or on the degree of severity of the collision.

The invention described above has the excellent advantageous effect of enabling an occupant be restrained with an appropriate internal pressure of an airbag, regardless of the collision mode of a frontal collision.

BRIEF DESCRIPTION OF THE DRAWINGS

Exemplary embodiments of the present disclosure will be described in detail based on the following figures, wherein.

DETAILED DESCRIPTION

First Exemplary Embodiment

Description follows regarding a vehicle front passenger seat airbag device 30 according to a first exemplary embodiment, with reference to the drawings. Note that in the drawings, the arrow FR and the arrow RH respectively indicate the front side and the right side, this being one vehicle width direction side, of an automobile (vehicle) V (see FIG. 1) to which a vehicle front passenger seat airbag device 30 has been applied. In the following, unless particularly stated otherwise, simple reference to front and rear directions indicates front and rear in the vehicle front-rear direction, and simple reference to left and right directions indicates left and right of the vehicle (when facing forward).

Outline of Automobile V Interior Configuration

Figure 1:
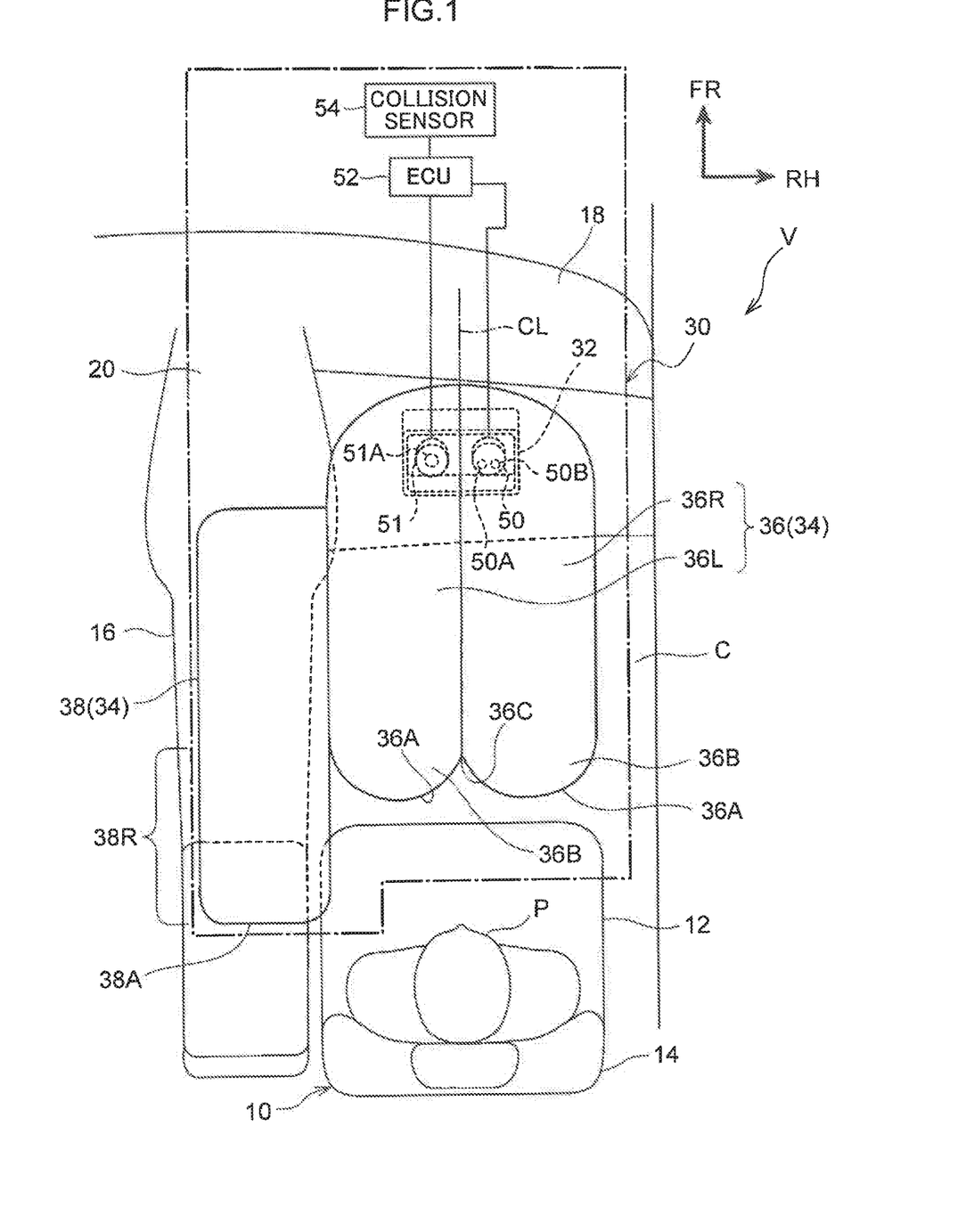
FIG. 1 is a plan view illustrating a right-side section of a front section of a cabin of a vehicle to which a vehicle front passenger seat airbag device according to a first exemplary embodiment has been applied, illustrating a state in which the airbag has inflated and deployed.

FIG. 1 is a schematic plan view illustrating a right-side section of a front section inside a cabin C of an automobile V applied with the vehicle front passenger seat airbag device 30. Note that FIG. 1 illustrates a state in which an airbag 34 of the vehicle front passenger seat airbag device 30, described later, has been inflated and deployed. As illustrated in FIG. 1, a front passenger seat vehicle seat 10 is installed at the right-side section of a front section of the cabin C. The vehicle seat 10 is configured including a seat cushion 12 on which an occupant P (hereafter referred to as front passenger seat occupant P) sits, and a seatback 14 that supports the back of the front passenger seat occupant P. A lower end of the seatback 14 is coupled to a rear end of the seat cushion 12.

Further, the vehicle seat 10 is provided with a seatbelt device (not illustrated in the drawings) for restraining the occupant. The seatbelt device is what is known as a three-point seatbelt device. Accordingly, the waist of the front passenger seat occupant P is restrained by a lap belt, and the upper body of the front passenger seat occupant P is restrained by a shoulder belt.

A driver seat vehicle seat, not illustrated, is installed at the left side of the vehicle seat 10. A center console 16 is disposed at a vehicle width direction center section of the automobile V (specifically, between the driver seat vehicle seat and the front passenger seat vehicle seat 10). Namely, the automobile V of the present exemplary embodiment is configured such that a center seat is not disposed between the driver seat vehicle seat and the front passenger seat vehicle seat 10. Note that the automobile V may have a configuration in which the center console 16 is not provided (for example, an aisle may be configured between left and right vehicle seats 10).

An instrument panel 18 extending in the vehicle width direction is provided at a front side of the vehicle seat 10, and a center panel 20 is provided at a vehicle width direction central portion of the instrument panel 18. A front end of the center console 16, described above, is joined to the vehicle width direction central portion of the instrument panel 18.

Vehicle Front Passenger Seat Airbag Device 30

As illustrated in FIG. 1, the vehicle front passenger seat airbag device 30 is configured including a substantially rectangular box shaped module case 32 (broadly speaking, an element understood to be a case) open toward the upper side; the airbag 34, housed in a folded state inside the module case 32, a right inflator 50 and left inflator 51 that eject gas so as to supply gas to the airbag 34, these being an example of plural inflators; an airbag controller ECU 52; and a collision sensor 54. The module case 32, the airbag 34, and the inflator 50 and the inflator 51 of the vehicle front passenger seat airbag device 30 are disposed inside the instrument panel 18 at a front side of the vehicle seat 10. A vehicle width direction center line CL of the module case 32 is set at a position substantially aligned with a seat width direction center line (not illustrated in the drawings) of the vehicle seat 10. Further, the module case 32 of the vehicle front passenger seat airbag device 30 is supported, for example, by instrument panel reinforcement (not illustrated in the drawings) extending along the vehicle width direction inside the instrument panel 18. An airbag door is formed in the instrument panel 18, at a location covering the module case 32.

Airbag 34

The airbag 34 is configured in a hag shape by, for example, stitching outer peripheral portions of plural base cloths together. In an inflated and deployed state of the airbag 34, the airbag 34 is configured including a front passenger seat airbag 36 that inflates and deploys at the front side of the front passenger seat occupant P, and a center airbag 38 that inflates and deploys at the vehicle width direction center side with respect to the front passenger seat airbag 36. Description follows regarding the front passenger seat airbag 36 and the center airbag 38.

Front Passenger Seat Airbag 36

The front passenger seat airbag 36 is configured including a left bag 36L and a right bag 36R, and is configured so as to inflate and deploy into a shape formed with substantially left-right symmetry in plan view. Further, a boundary line between the left bag 36L and the right bag 36R (namely, a vehicle width direction center line of the front passenger seat airbag 36) is configured substantially aligned with the vehicle width direction center line CL of the module case 32. Moreover, a pair of left and right inflation portions 36B that protrude toward the rear side in plan view are formed at a rear end of the front passenger seat airbag 36 that has been inflated and deployed. The inflation portions 36B are configured so as to be respectively positioned at the vehicle front side of the shoulders of the front passenger seat occupant P. In other words, a recess 36C open toward the tear side is formed in a vehicle width direction central portion (a portion between the left bag 36L and the right bag 36R) of a rear end of the front passenger seat airbag 36 that has been inflated and deployed at the vehicle front side of the occupant P seated in the front passenger seat. The recess 36C is configured so as to be positioned in front side of the head of the front passenger seat occupant P. Outer peripheral faces of the pair of left and right inflation portions 36B configure occupant restraint faces 36A.

Center Airbag 38

As illustrated in FIG. 1, the center airbag 38 is in communication with the front passenger seat airbag 36, and is configured so as to inflate and deploy in the front-rear direction and adjacent to the front passenger seat airbag 36 in the vehicle width direction center side. Specifically, the center airbag 38 is offset toward the vehicle width direction center side of the inflator 50 and inflator 51 pair, described later, and configured so as to inflate and deploy in the front-rear direction at the upper side of the center console 16. Thus, the airbag 34 is configured so as to inflate and deploy expanding toward the vehicle width direction center side, into a shape that is not left-right symmetrical in plan view.

Further, the center airbag 38 that has been inflated and deployed forms a substantially rectangular shape having its length direction in the front-rear direction in plan view, and a rear face 38A of the center airbag 38 is positioned further toward the vehicle rear side in the front-rear direction than the rear end of the front passenger seat airbag 36. Namely, a vehicle-rear-side end 38R of the center airbag 38 projects out toward the vehicle rear side with respect to the front passenger seat airbag 36 in plan view, and is positioned obliquely in front of the vehicle width direction center side of the head of the front passenger seat occupant P.

Note that vent holes (not illustrated in the drawings) are provided in the front passenger seat airbag 36 and in the center airbag 38. The size of the vent holes (area of the openings) are pre-set as appropriate such that the internal pressure of the airbag 34 is a specific internal pressure when the front passenger seat occupant P is restrained by the airbag 34.

Inflator 50 and Inflator 51

As illustrated in FIG. 1, the right inflator 50 and the left inflator 51, serving as an example of plural inflators, are built into a front end of the airbag 34 (specifically, the front passenger seat airbag 36) and are disposed side-by-side in the vehicle width direction. Specifically, the right inflator 50 and left inflator 51 pair are disposed at left-right symmetrical positions with respect to the vehicle width direction center line CL of the vehicle front passenger seat airbag device 30 in plan view. The inflator 50 and the inflator 51 are what are known as disk-type inflators; are formed in hollow, substantially circular column shapes; and are disposed with their axial directions in the vertical direction. Non-illustrated attachment flanges are provided to vertical direction intermediate portions at outer peripheral portions of the inflator 50 and inflator 51.

The inflator 50 and the inflator 51 include plural squibs. The inflator 50 is a dual-type inflator including, a first squib 50A and a third squib 50B. The inflator 51 is a single-type inflator including a second squib 51A.

Respective upper portions of the inflator 50 and the inflator 51 are configured by gas ejectors. Plural gas ejection holes (not illustrated in the drawings) are formed in outer peripheral faces of the gas ejectors. The gas ejection holes are disposed at specific intervals around the circumferential direction of the inflator 50 and the inflator 51. Thus, the gas generated by the inflator 50 and the inflator 51 is ejected in a radial pattern from the inflator 50 and the inflator 51 in plan view.

Moreover, as illustrated in FIG. 1, the inflator 50 and the inflator 51 are electrically connected to the airbag controller ECU 52 (controller). When the inflator 50 and the inflator 51 are actuated by control signals from the airbag controller ECU 52, the airbag 34 is inflated and deployed on receipt of gas supplied from the inflator 50 and the inflator 51. Further accompanying inflation and deployment of the airbag 34, an airbag door (the instrument panel 18) is split open by the airbag 34 such that the airbag 34 is inflated and deployed to the outer side (exterior side) of the instrument panel 18. Description follows regarding the airbag controller ECU 52.

Airbag Controller ECU 52

The airbag controller ECU 52 is configured by a microcomputer including a central processing unit (CPU), read-only memory (ROM), random-access memory (RAM), and the like. The airbag controller ECU 52 is electrically connected to the collision sensor 54 (or sensor group), and the airbag controller ECU 52 is electrically connected to the inflator 50 and the inflator 51, described above. Further, the airbag controller ECU 52 can detect and predict each collision mode of (the occurrence or inevitability of a frontal collision to the automobile V, to which the airbag controller ECU 52 has been applied, based on information from the collision sensor 54. The airbag controller ECU 52 expands a program pre-stored in the ROM to the RAM and executes the program using the CPU, thereby controlling actuation of the inflator 50 and the inflator 51 so as to control inflation and deployment of the airbag 34.

When a collision is detected or predicted based on information from the collision sensor 54, the airbag controller ECU 52 actuates the inflator 50 and the inflator 51. Note that the collision modes under which the airbag controller ECU 52 actuates the inflator 50 and the inflator 51 encompass frontal collisions (head-on collisions), these being full overlap collisions, and oblique collisions and small overlap collisions, these being collisions to a position offset to one vehicle width direction side. Accordingly, the airbag controller ECU 52 detects or predicts whether or not the collision mode is a head-on collision, an oblique collision, or a small overlap collision based on information from the collision sensor 54.

Herein, an oblique collision (MDB oblique collision) is, for example, obliquely to the front as stipulated by the NHTSA (for example, a collision at a relative angle of 15° and a vehicle width direction overlap amount of approximately 35% with respect to the impactor). The present exemplary embodiment envisages, as an example, an oblique collision at a relative speed of 90 km/hr. Further, out of frontal collisions to the automobile V, a small overlap collision is a collision that has, for example, a vehicle width direction overlap amount of 25% or less with respect to the impactor as stipulated by the IIHS. For example, a collision to the vehicle width direction outer side of a front side member, this being vehicle body framework, corresponds to a small overlap collision. The present exemplary embodiment envisages, as an example, a small overlap collision at a relative speed of 64 km/hr.

In cases in which the collision sensor 54 is implemented by plural sensors for detecting information relating to acceleration caused by a collision, for example, the airbag controller ECU 52 detects or predicts (the occurrence or inevitability of) a frontal collision to the automobile V, to which the airbag controller ECU 52 has been applied, based on information relating to acceleration caused by the collision from each of the plural sensors, and the airbag controller ECU 52 detects or predicts whether the collision mode of the frontal collision is a head-on collision, an oblique collision, or a small overlap collision.

Figure 2:
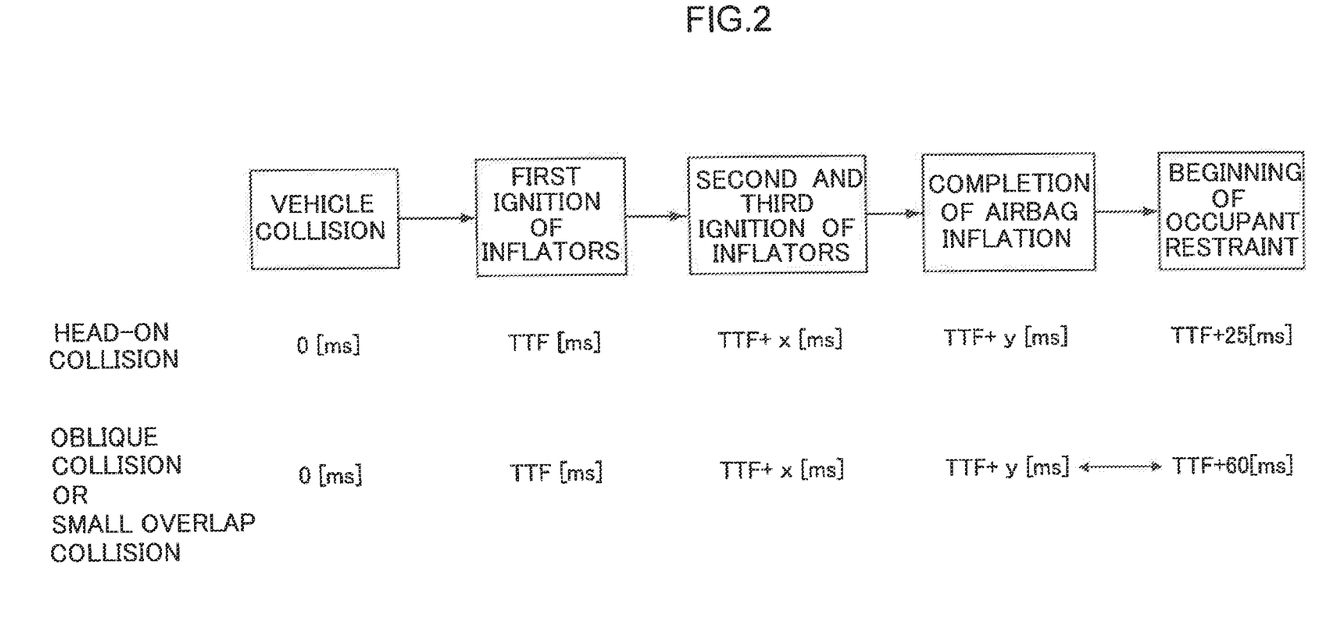
FIG. 2 is a diagram illustrating examples of ignition timings of respective squibs in cases in which a head-on collision has occurred and in cases in which an oblique collision or small overlap collision has occurred.

FIG. 2 illustrates examples of ignition timings for each squib in the inflators, in head-on collisions and in oblique collisions or small overlap collisions. As illustrated in FIG. 2, in cases in which a head-on vehicle collision has occurred at time 0 (ms), the first squib 50A of the inflator 50 is ignited, for example, at a time to fire (TTF) time (ms). Then, the second squib 51A of the inflator 51 and the third squib 50B of the inflator 50 are ignited substantially simultaneously at TTF+x (ms). Inflation and deployment of the airbag 34 completes at time TTF+y (ms), and the occupant is restrained beginning from TTF+25 (ms). Note that x, y are values that satisfy the condition x<y.

On the other hand, in cases in which an oblique collision or small overlap collision has occurred, as illustrated in FIG. 2, the occupant is restrained beginning from TTF+60 (ms), for example. Thus, in cases in which an oblique collision or small overlap collision has occurred, when each squib in the inflators is ignited similarly to cases in which a head-on collisions has occurred, there is an increased time interval between when inflation and deployment of the airbag 34 completes to when occupant restraint begins.

Taking oblique collisions and small overlap collisions into account, the vent holes (not illustrated in the drawings) in the airbag 34 need to be smaller in order to retain gas supplied to the airbag 34 until occupant restraint begins. However, when the vent holes are made smaller, the airbag 34 adopts a harder state, placing a large burden on the occupant when a head-on collision has occurred.

Therefore, in the present exemplary embodiment, the timings at which the inflator 50 and the inflator 51 are actuated are controlled to control the internal pressure of the airbag 34. Specifically, in cases in which a head-on collision has occurred, and in cases in which an oblique collision or small overlap collision has occurred, the timing at which gas is input to the airbag 34 is controlled by changing the timings for ignition of the first squib 50A, the second squib 51A, and the third squib 50B of the inflator 50 and the inflator 51.

Restraint performance is therefore achieved in both head-on collisions and in oblique collisions or small overlap collisions, these being collision modes differing in occupant restraint timings. Further, the vent holes for exhausting gas from the airbag 34 do not need to be set smaller, and it is possible to enlarge the vent holes. A state from which gas is readily exhausted is thereby adopted, and the airbag 34 is softer when restraining the occupant, enabling burden on the occupant when a head-on collision has occurred to be lessened.

The airbag controller ECU 52 controls the timing of ignition of each of the squibs 50A, 50B, and 51A included in the inflator 50 and the inflator 51 such that the peak internal pressure of the airbag 34 inflated and deployed when an oblique collision or small overlap collision has occurred is delayed compared to the peak internal pressure of the airbag 34 inflated and deployed when a head-on collision has occurred.

Specifically, in cases in which the occurrence of an oblique collision or small overlap collision has been detected or predicted based on information from the collision sensor 54, the airbag controller ECU 52 controls the timing of ignition of at least one squib that is ignited second or later from out of the squibs included in the inflator 50 and the inflator 51 so as to be delayed compared to the respective timing of ignition in cases in which a head-on collision has occurred.

In cases in which a head-on collision has occurred, for example, the airbag controller ECU 52 controls the second squib 51A of the inflator 51 and the third squib 50B of the inflator 50 so as to ignite the second squib 51A and the third squib 50B substantially simultaneously after igniting the first squib 50A of the inflator 50.

Further, in cases in which an oblique collision or small overlap collision has occurred, the airbag controller ECU 52 sequentially ignites the first squib 50A of the inflator 50 and then the second squib 51A of the inflator 51. After the first squib 50A and the second squib 51A have been sequentially ignited and before inflation and deployment of the airbag 34 is completed, the airbag controller ECU 52 then controls the third squib 50B of the inflator 50 so as to ignite the third squib 50B.

Figure 3:
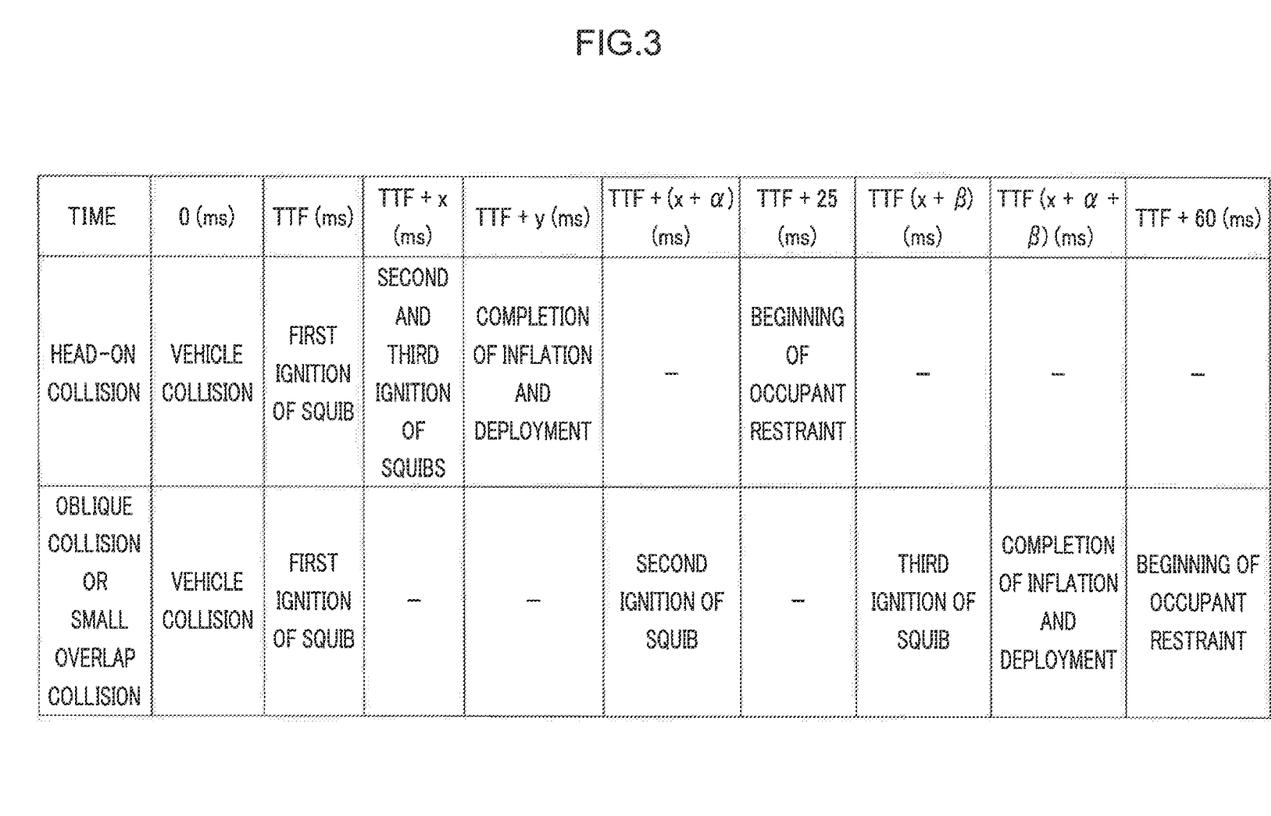
FIG. 3 is an explanatory diagram for explaining example ignition timings of respective squibs in the first exemplary embodiment.

FIG. 3 illustrates an example of timing control, by the airbag controller ECU 52, for igniting each squib included in each inflator.

As illustrated in FIG. 3, in cases in which a head-on collision has occurred, the airbag controller ECU 52 ignites the first squib 50A of the inflator 50 at TTF (ms). After the first squib 50A of the inflator 50 has been ignited, the airbag controller ECU 52 then controls the second squib 51A of the inflator 51 and the third squib 50B of the inflator 50 so as to ignite at TTF+x (ms). Thus, inflation and deployment of the airbag 34 completes at TTF+y (ms), and occupant restraint begins from TTF+25 (ms).

Further, in cases in which an oblique collision or small overlap collision has occurred, the airbag controller ECU 52 ignites the first squib 50A of the inflator 50 at TTF (ms). The airbag controller ECU 52 then controls the second squib 51A of the inflator 51 so as to ignite at TTF+x+$\alpha$ (ms). Next, the airbag controller ECU 52 controls the third squib 50B of the inflator 50 so as to ignite at TTF+x+$\beta$ (ms). Thus, inflation and deployment of the airbag 34 completes at TTF+x+$\alpha$+$\beta$ (ms), and occupant restraint begins from TTF+60 (ms). Note that $\alpha$, $\beta$ satisfy the condition $\alpha<\beta$, and TTF+x+$\alpha$ (ms) and TTF+x+$\beta$ (ms) are preset to a time before inflation and deployment of the airbag 34 is configured to complete. The time at which inflation and deployment completes is acquired beforehand by experiment or the like.

Figure 4:
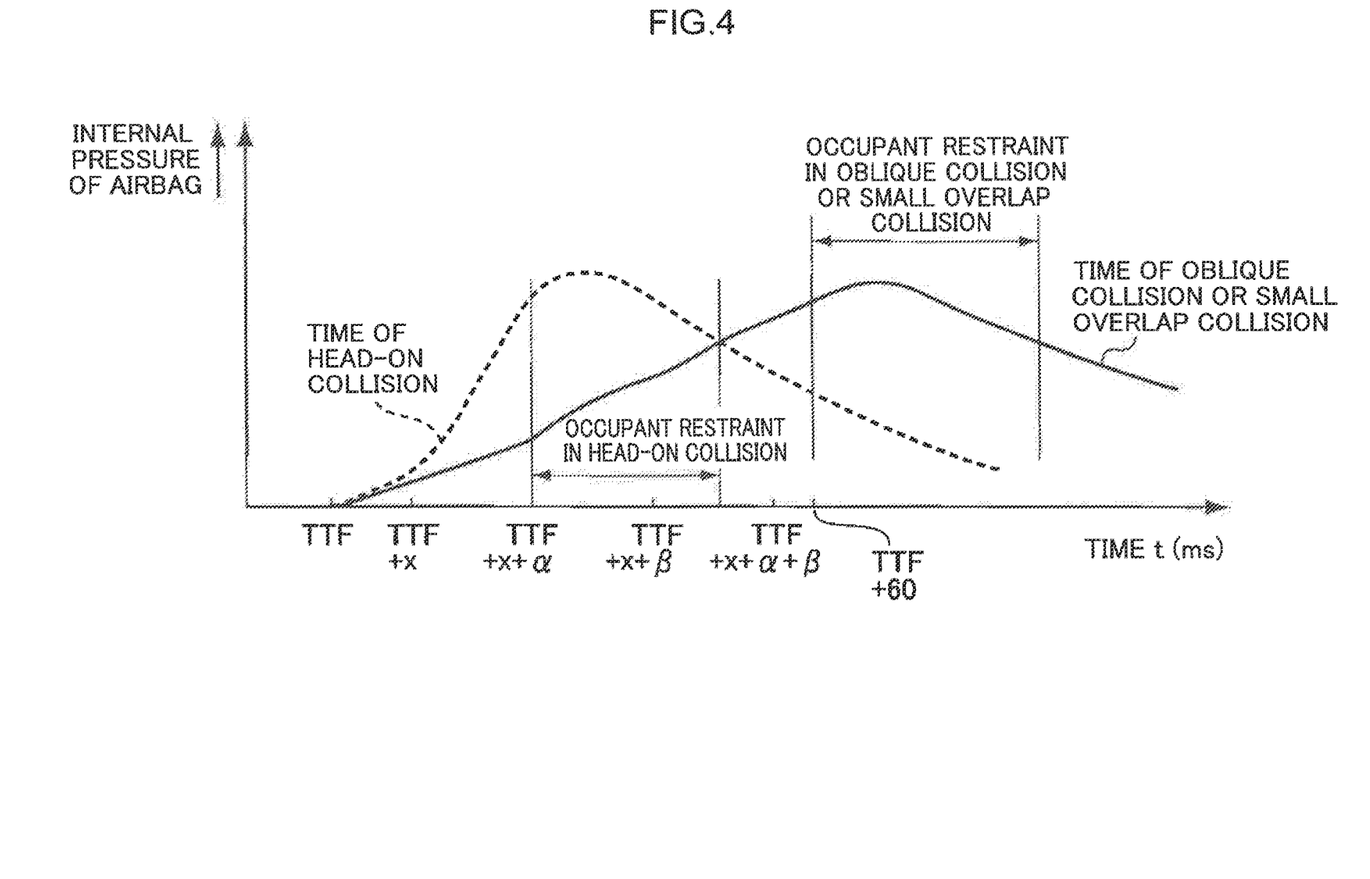
FIG. 4 is an explanatory diagram for explaining airbag internal pressure states achieved as a result of the ignition timings of respective squibs in the first exemplary embodiment.

Next, FIG. 4 illustrates an example of change over time in the internal pressure of the implemented airbag 34 caused by the present exemplary embodiment.

As illustrated in FIG. 4, in cases in which a head-on collision has occurred, the second squib 51A of the inflator 51 and the third squib 50B of the inflator 50 are ignited at TTF+x (ms). In cases in which an oblique collision or small overlap collision has occurred, the second squib 51A of the inflator 51 is ignited at TTF+x+$\alpha$ (ms), and the third squib 50B of the inflator 50 is ignited at TTF+x+$\beta$ (ms).

Thus, as illustrated in FIG. 4, the peak internal pressure of the airbag 34 in an oblique collision or small overlap collision is delayed compared to the peak internal pressure of the airbag 34 in cases in which a head-on collision has occurred, and the occupant is able to be restrained at an appropriate timing according to the collision mode of the frontal collision. Further, the vent holes for exhausting gas from the airbag 34 do not need to be set smaller, and it is possible to enlarge the vent holes, enabling burden on the occupant when a head-on collision has occurred to be lessened.

Next, description follows regarding operation and advantageous effects of the present exemplary embodiment.

Figure 5:
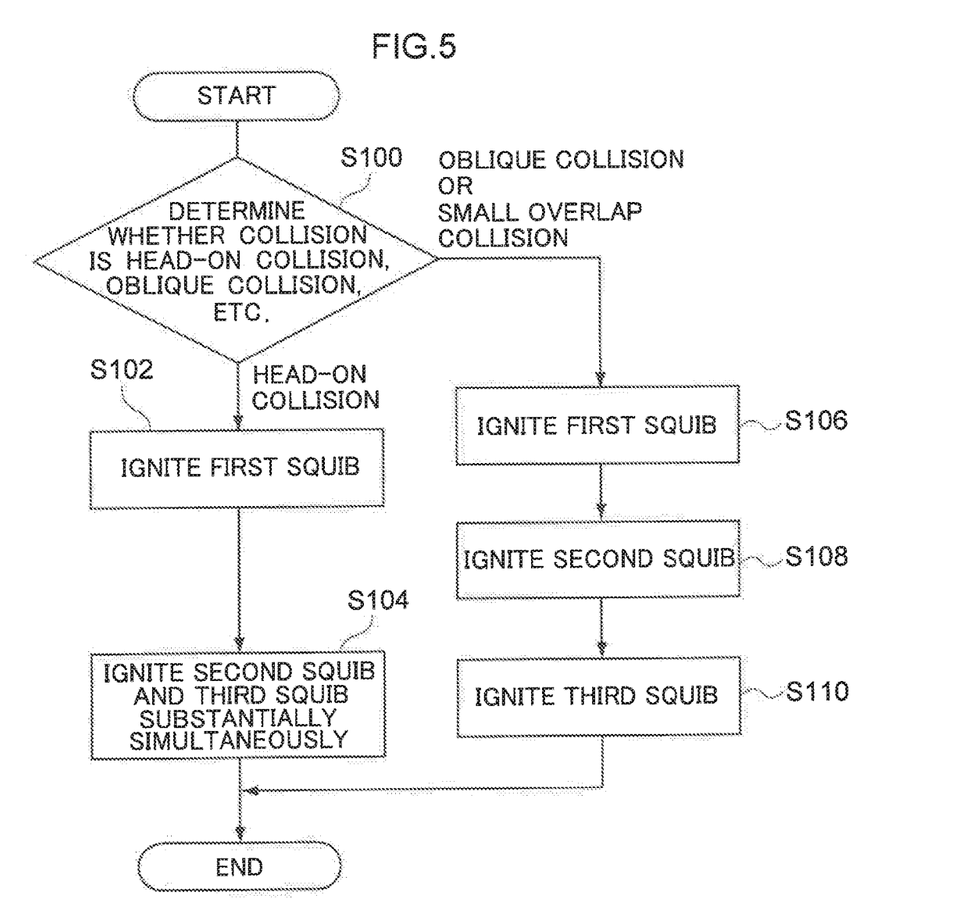
FIG. 5 is a flowchart illustrating an example of control performed by an airbag control ECU of a vehicle front passenger seat airbag device according to the first exemplary embodiment.

In the vehicle front passenger seat airbag device 30 configured as described above, the airbag controller ECU 52 executes the processing routine illustrated in FIG. 5 when a collision to the automobile V is detected or predicted based on a signal from the collision sensor 54. FIG. 5 is a flowchart illustrating an example of control executed by the vehicle front passenger seat airbag device 30 according to the present exemplary embodiment.

First, at step S100, the airbag controller ECU 52 determines whether or not the collision mode of a frontal collision is a head-on collision, or an oblique collision or small overlap collision based on a signal from the collision sensor 54. Processing transitions to step S102 in cases in which the airbag controller ECU 52 has determined the collision mode of the frontal collision to be a head-on collision. On the other hand, processing transitions to step S106 in cases in which the airbag controller ECU 52 has determined the collision mode of the frontal collision to be an oblique collision or small overlap collision.

At step S102, the airbag controller ECU 52 ignites the first squib 50A of the inflator 50.

At step S104, the airbag controller ECU 52 controls the second squib 51A of the inflator 51 and the third squib 50B of the inflator 50 so as to ignite substantially simultaneously, at a timing at which x (ms) has elapsed since the ignition at step S102, and then ends processing.

At step S106, the airbag controller ECU 52 ignites the first squib 50A of the inflator 50.

At step S108, the airbag controller ECU 52 controls the second squib 51A of the inflator 51 so as to ignite at a timing at which x+$\alpha$ (ms) has elapsed since the ignition at step S106.

At step S110, the airbag controller ECU 52 controls the third squib 50B of the inflator 50 so as to ignite at a timing at which x+$\beta$ (ms) has elapsed since the ignition at step S106, and then ends processing.

Thus, each of the squibs in the inflator 50 and the inflator 51 are ignited at different timings according to the collision mode of the frontal collision. The airbag 34 is inflated and deployed on receipt of gas supplied from the inflator 50 and the inflator 51 while splitting open the airbag door set in the instrument panel 18. Then, the front passenger seat airbag 36 is inflated and deployed at the front side of the front passenger seat occupant P, and the center airbag 38 is inflated and deployed at the vehicle width direction center side of the front passenger seat airbag 36.

As described above, the vehicle front passenger seat airbag device according to the first exemplary embodiment enables an occupant to be restrained with an appropriate airbag internal pressure set according to the collision mode of a frontal collision, by controlling the timing of ignition of each squib included in the plural inflators such that the peak internal pressure of the airbag inflated and deployed when an oblique collision or small overlap collision has occurred is delayed compared to the peak internal pressure of the airbag inflated and deployed when a head-on collision has occurred.

According to the present exemplary embodiment, there is no need to set the vent holes smaller for oblique collisions and small overlap collisions, and it is possible to enlarge the vent holes, enabling the burden on the occupant when a head-on collision has occurred to be lessened.

Second Exemplary Embodiment

Next, description follows regarding a second exemplary embodiment. Note that portions configured similarly to those of the first exemplary embodiment are appended with the same reference numerals, and description thereof is omitted.

The second exemplary embodiment differs from the first exemplary embodiment in the point in that, in cases in which an oblique collision or small overlap collision has occurred, control is performed such that the third squib 50B of the inflator 50 is ignited after the first squib 50A and the second squib 51A of the inflator 50 and the inflator 51 have been sequentially ignited and after inflation and deployment of the airbag 34 is completed.

In cases in which a head-on collision has occurred, similarly to in the first exemplary embodiment, the airbag controller ECU 52 of the second exemplary embodiment controls the second squib 51A of the inflator 51 and the third squib 50B of the inflator 50 so as to ignite substantially simultaneously after igniting the first squib 50A of the inflator 50.

Further, in cases in which an oblique collision or small overlap collision has occurred, the airbag controller ECU 52 of the second exemplary embodiment sequentially ignites the first squib 50A of the inflator 50 and then the second squib 51A of the inflator 51. The airbag controller ECU 52 controls the third squib 50B of the inflator 50 so as to ignite after sequentially igniting the first squib 50A and then the second squib 51A and after inflation and deployment of the airbag 34 is completed.

Figure 6:
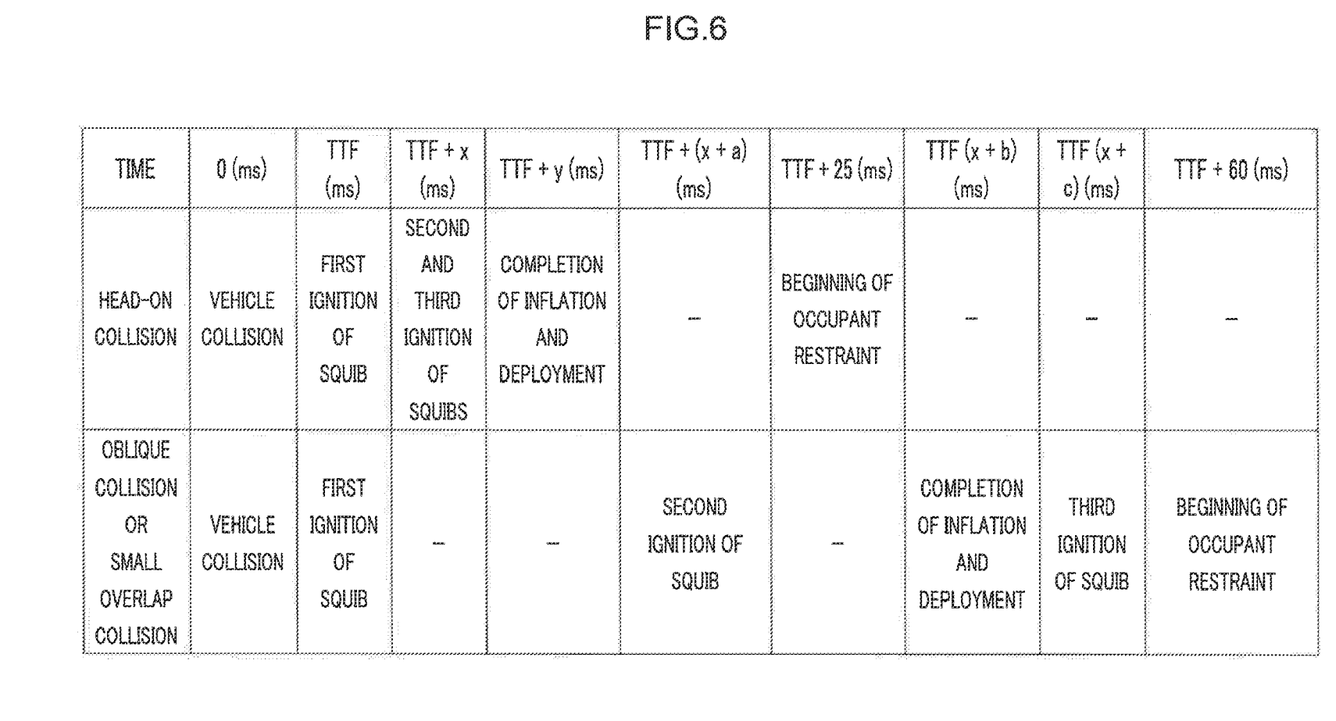
FIG. 6 is an explanatory diagram corresponding to FIG. 3 for explaining examples of ignition timings of respective squib in a second exemplary embodiment.

FIG. 6 illustrates an example of timing control, by the airbag controller ECU 52 of the second exemplary embodiment, for igniting each squib included in each inflator.

As illustrated in FIG. 6, in cases in which a head-on collision has occurred, the airbag controller ECU 52 of the second exemplary embodiment ignites the first squib 50A of the inflator 50 at TTF (ms). After igniting the first squib 50A of the inflator 50, the airbag controller ECU 52 controls the second squib 51A of the inflator 51 then the third squib 50B of the inflator 50 so as to ignite at TTF+x (ms). Thus, inflation and deployment of the airbag 34 completes at TTF+x+y (ms), and occupant restraint begins from TTF+25 (ms).

In cases in which an oblique collision or small overlap collision has occurred, the airbag controller ECU 52 of the second exemplary embodiment ignites the first squib 50A of the inflator 50 at TTF (ms). Then, the airbag controller ECU 52 controls the second squib 51A of the inflator 51 so as to ignite at TTF+x+a (ms). Then, inflation and deployment of the airbag 34 completes at TTF+x+b (ms). After inflation and deployment of the airbag 34 is completed, next, the airbag controller ECU 52 controls the third squib 50B of the inflator 50 so as to ignite at TTF+x+c (ms). Occupant restraint accordingly begins at TTF+60 (ms). Note that a, b, and c satisfy the condition a<b<c, TTF+a (ms) is preset to a time before inflation and deployment of the airbag 34 completes, and TTF+c (ms) is preset to a time after inflation and deployment of the airbag 34 completes. The time at which inflation and deployment completes is acquired beforehand by experiment or the like.

Next, description follows regarding operation and advantageous effects of the second exemplary embodiment.

When a collision to the automobile V is detected or predicted based on a signal from the collision sensor 54, the airbag controller ECU 52 of the vehicle front passenger seat airbag device 30 of the second exemplary embodiment executes the processing routine illustrated in FIG. 5. FIG. 5 is a flowchart illustrating an example of control executed by the vehicle front passenger seat airbag device 30 according to the present exemplary embodiment.

Each of the processes from step S100 to step S106 is executed similarly to in the first exemplary embodiment.

At step S108, the airbag controller ECU 52 controls the second squib 51A of the inflator 51 so as to ignite at a timing at which x+a (ms) has elapsed since igniting the first squib 50A of the inflator 50 at step S106.

At step S110, the airbag controller ECU 52 controls the third squib 50B of the inflator 50 so as to ignite at a timing at which x+c (ms) has elapsed since igniting the first squib 50A of the inflator 50 at step S106, and then processing ends. In the second exemplary embodiment, after the first squib 50A and the second squib 51A have been ignited, the internal pressure of the airbag 34 is maintained, due to configuring the third squib 50B to ignite after inflation and deployment of the airbag 34 is completed. Igniting the third squib 50B after inflation and deployment of the airbag 34 is completed enables the internal pressure of the airbag 34 to be maintained such that the occupant can be restrained with an appropriate airbag internal pressure.

Note that other configuration and operation of the vehicle front passenger seat airbag device according to the second exemplary embodiment is the same as those of the first exemplary embodiment, and so description thereof is omitted.

As described above, in cases in which an oblique collision or small overlap collision has occurred, the vehicle front passenger seat airbag device according to the second exemplary embodiment controls the third squib so as to ignite after sequentially igniting the first squib and then the second squib and after inflation and deployment of the airbag is completed. The occupant is thereby able to be restrained with an appropriate airbag internal pressure regardless of the collision mode of the frontal collision. Further, in cases in which an oblique collision or small overlap collision has occurred, it is possible to raise the airbag internal pressure with a timing according to the oblique collision or small overlap collision, enabling the occupant to be restrained by the airbag with an appropriate airbag internal pressure. It is also possible to raise the airbag internal pressure at a timing according to an oblique collision or small overlap collision, enabling the degrees of freedom in design to be increased.

Third Exemplary Embodiment

Description follows regarding a third exemplary embodiment. Note that portions configured similarly to those of the first or second exemplary embodiment are appended with the same reference numerals, and description thereof is omitted.

In the third exemplary embodiment, the control method of the first exemplary embodiment in which, in cases in which an oblique collision or small overlap collision has occurred, control is performed so as to ignite the third squib after sequentially igniting the first squib and then the second squib and before inflation and deployment of the airbag is completed, is referred to as first control. Further, the control method of the second exemplary embodiment in which, in cases in which an oblique collision or small overlap collision has occurred, control is performed so as to ignite the third squib 50B after sequentially igniting the first squib 50A and then the second squib 51A and after inflation and deployment of the airbag is completed, is referred to as second control.

The third exemplary embodiment differs from the first and the second exemplary embodiments in the point that, in cases in which an oblique collision or small overlap collision has occurred, first control and second control are switched between based on the front-rear position of the seat of the occupant.

Figure 7:
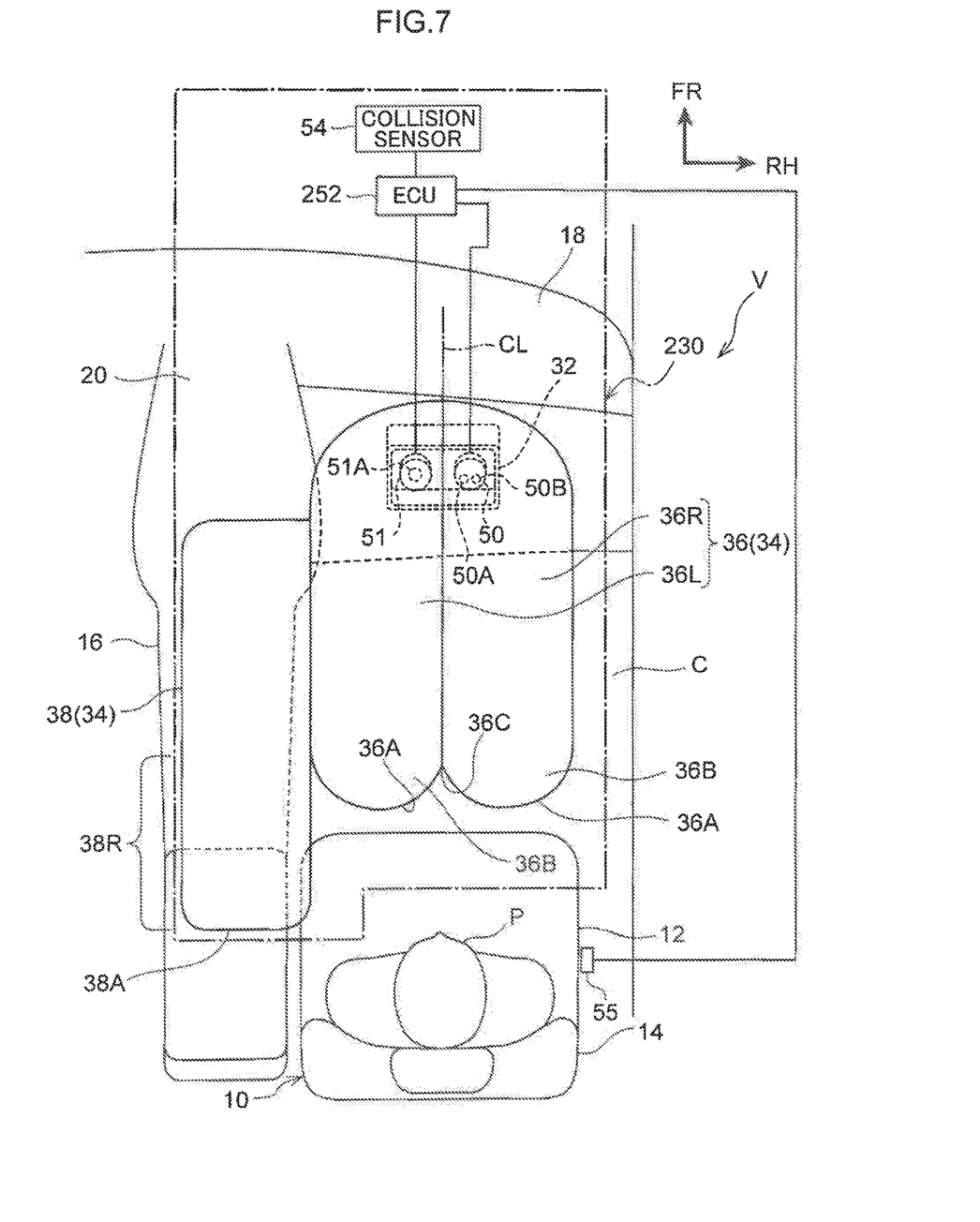
FIG. 7 is a plan view illustrating a right-side section of a front section of a cabin of a vehicle to which a vehicle front passenger seat airbag device according to a third exemplary embodiment has been applied, illustrating a state in which the airbag has inflated and deployed.

FIG. 7 is a schematic plan view illustrating a right-side section of a front section inside a cabin C of an automobile V applied with a vehicle front passenger seat airbag device 230.

In the third exemplary embodiment, a seat slide sensor 55 is attached to a seat slide rail (not illustrated in the drawings) provided at a lower end of the seat cushion 12. The seat slide sensor 55 detects a seat slide position of the seat cushion 12.

As illustrated in FIG. 7, an inflator 50 and an inflator 51 as described above, a collision sensor 54, and a seat slide sensor 55, are electrically connected to an airbag controller ECU 252.

The airbag controller ECU 252 of the third exemplary embodiment switches between first control and second control according to the seat slide position of the seat cushion 12 detected by the seat slide sensor 55.

For example, in cases in which the seat slide position of the seat cushion 12 is detected by the seat slide sensor 55 as being positioned further to the vehicle front than a predetermined position, when an oblique collision or small overlap collision has occurred, the airbag controller ECU 252 controls the timing for igniting each squib under first control. Namely, the airbag controller ECU 252 controls the third squib 50B so as to ignite after sequentially igniting the first squib 50A and then the second squib 51A and before inflation and deployment of the airbag 34 is completed.

Further, in cases in which the seat slide position of the seat cushion 12 is detected by the seat slide sensor 55 as being positioned further to the vehicle rear side than a predetermined position, when an oblique collision or small overlap collision has occurred, the airbag controller ECU 252 controls the timing for igniting each squib under second control. Namely, the airbag controller ECU 252 controls the third squib 50B so as to ignite after sequentially igniting the first squib 50A and then the second squib 51A and after inflation and deployment of the airbag 34 is completed.

Description follows regarding operation and advantageous effects of the present exemplary embodiment.

Figure 8:
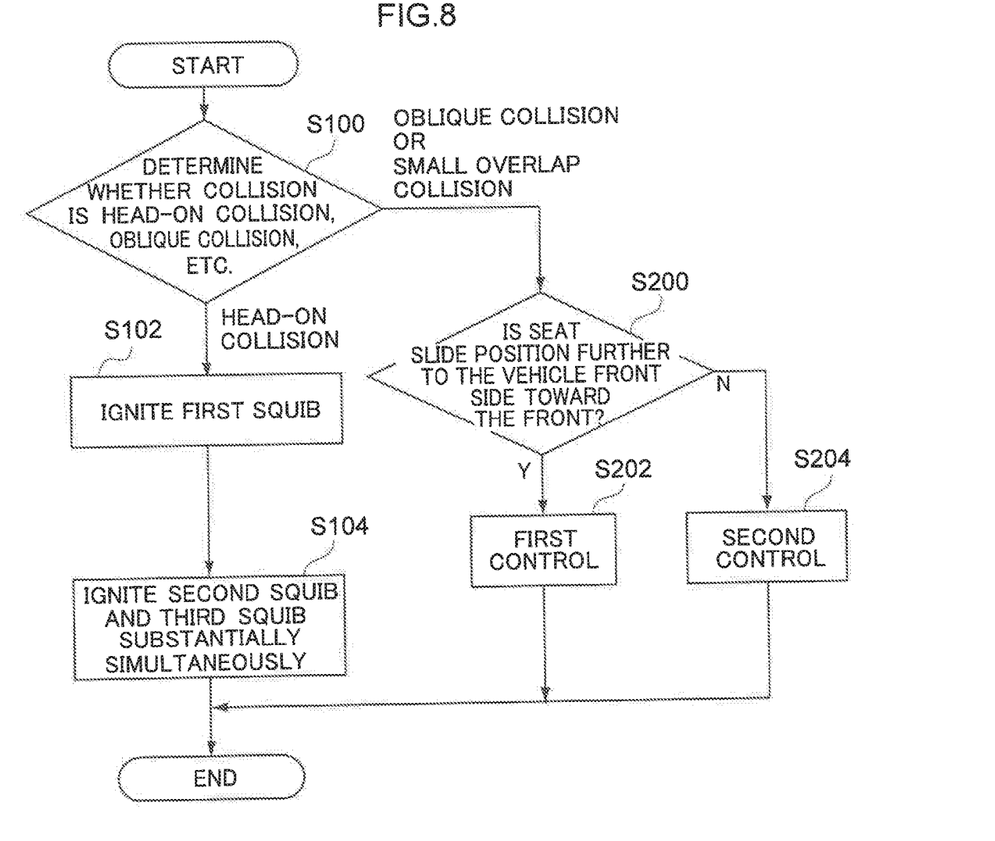
FIG. 8 is a flowchart illustrating an example of control performed by an airbag control ECU of a vehicle front passenger seat airbag device according to the third exemplary embodiment.

In the vehicle front passenger seat airbag device 230 configured as described above, the airbag controller ECU 252 executes the processing routine illustrated in FIG. 8 when a collision to the automobile V is detected or predicted based on a signal from the collision sensor 54. FIG. 8 is a flowchart illustrating an example of control executed by the vehicle front passenger seat airbag device 230 according to the present exemplary embodiment.

First, at step S100, the airbag controller ECU 252 determines whether the collision mode of the frontal collision is a head-on collision, or is an oblique collision or small overlap collision based on a signal from the collision sensor 54. In cases in which the airbag controller ECU 252 has determined that the collision mode is a head-on collision, processing transitions to step S102. On the other hand, in cases in which the airbag controller ECU 252 has determined that the collision mode of a frontal collision is an oblique collision or small overlap collision, processing transitions to step S200.

At step S102, the airbag controller ECU 252 ignites the first squib 50A of the inflator 50.

At step S104, the airbag controller ECU 252 controls the second squib 51A of the inflator 51 and the third squib 50B so as to ignite substantially simultaneously at a timing at which x (ms) has elapsed since the igniting at step S102, and then processing ends.

At step S200, the airbag controller ECU 252 determines whether or not the seat slide position is positioned further to the vehicle front side than the predetermined position based on the seat slide position of the seat cushion 12 detected by the seat slide sensor 55. Then, in cases in which the seat slide position is further to the vehicle front side than the predetermined position, processing transitions to step S202. On the other hand, in cases in which the seat slide position is further to the vehicle rear side than the predetermined position, processing transitions to step S204.

At step S202, the airbag controller ECU 252 controls the timing for igniting each squib under first control. Namely, the airbag controller ECU 252 controls the third squib 50B so as to ignite after sequentially igniting the first squib 50A and then the second squib 51A and before inflation and deployment of the airbag 34 is completed, and then processing ends.

At step S204, the airbag controller ECU 252 controls the timing for igniting each squib under second control. Namely, the airbag controller ECU 252 controls the third squib 50B so as to ignite after sequentially igniting the first squib 50A and then the second squib 51A and after inflation and deployment of the airbag 34 is completed, and then processing ends.

As described above, the vehicle front passenger seat airbag device according to the third exemplary embodiment enables an occupant to be restrained at an appropriate timing according to the collision mode of a frontal collision by switching, based on the front-rear position of the seat of the occupant, between first control, in which control is performed so as to ignite the third squib after sequentially igniting the first squib and then the second squib and before inflation and deployment of the airbag is completed, and second control, in which control is performed so as to ignite the third squib after sequentially igniting the first squib and then the second squib and after inflation and deployment of the airbag is completed.

Further, in the third exemplary embodiment, description has been given of an example of a case of switching between first control and second control according to the seat slide position of the seat cushion 12 detected by the seat slide sensor 55. However, switching between first control and second control may be based on the degree of severity of the vehicle collision. For example, with the acceleration obtained from the collision sensor 54 serving as the degree of severity of the collision, first control and second control may be switched between according to whether or not the magnitude of the acceleration obtained from the collision sensor 54 is greater than a predetermined threshold value.

For example, in cases in which the acceleration obtained from the collision sensor 54 is greater than the predetermined threshold value, the airbag controller ECU 252 controls the timing for igniting each squib under first control. Further, in cases in which the acceleration obtained from the collision sensor 54 is the predetermined threshold value or less, the airbag controller ECU 252 controls the timing for igniting each squib under second control.

Further, in the exemplary embodiments described above, description has been given of an example of a case in which the airbag controller ECU 52 or the airbag controller ECU 252 ignites the first squib after detecting or predicting whether the collision mode of the frontal collision is a head-on collision, an oblique collision, or a small overlap collision based on information from the collision sensor 54. However, there is no limitation thereto. For example, configuration may be made in which control is performed so as to ignite the first squib after a collision has been detected or predicted and before determining the collision mode, and after igniting the first squib, determination then made as to whether the collision mode of the frontal collision was a head-on collision, an oblique collision, or a small overlap collision.

As in the exemplary embodiments described above, when the first squib 50A of the right inflator 50, the second squib 51A of the left inflator 51, and the third squib 50B of the right inflator 50 are ignited in this sequence, each squib of the inflators is ignited in left-right alternation, and this is preferable as it is thought to stabilize the deployment behavior of the airbag 34.

However, the sequence in which each of the squibs is ignited is not limited to that in the above exemplary embodiments, and the squibs may be ignited in any sequence. For example, control may be performed in which the first squib 50A of the inflator 50, the third squib 50B of the right inflator 50, and the second squib 51A of the inflator 51 are ignited in this sequence.

Note that description has been given in which processing performed by the airbag controller ECU 52 or the airbag controller ECU 252 in the exemplary embodiments above is software processing performed by executing a program; however, the processing may be performed by hardware. Alternatively, processing may be made by a combination of both software and hardware. Further, the program stored on the ROM may be stored and distributed on various types of storage media.

Moreover, the invention is not limited to the above, and obviously various other modifications may be implemented within a range not departing from the spirit of the invention.

What is claimed is:

1. A vehicle front passenger seat airbag device comprising:
   a plurality of inflators each comprising a squib;
   an airbag including:
      a front passenger seat airbag that is inflated and deployed on receipt of gas supplied from the plurality of the inflators, and that is inflated and deployed at a vehicle front side of an occupant seated in a front passenger seat, and
      a center airbag that is inflated and deployed at a vehicle width direction center side of the front passenger seat airbag, and that includes a vehicle-rear-side end that projects out further toward a vehicle rear side when inflated and deployed than a rear end of the front passenger seat airbag when inflated and deployed; and
   a controller that controls timings for igniting each squib included in the plurality of inflators such that a peak internal pressure of the airbag inflated and deployed when an oblique collision or small overlap collision has occurred is delayed, compared to a peak internal pressure of the airbag inflated and deployed when a head-on collision has occurred, wherein
   the controller causes a timing for igniting at least one of the squibs ignited second or later out of the squibs included in the plurality of inflators to be delayed in cases in which an oblique collision or small overlap collision has occurred, compared to a timing for igniting the corresponding squib in cases in which a head-on collision has occurred;
   the plurality of inflators include a first squib, a second squib, and a third squib; and
   the controller causes:
      the second squib and the third squib to ignite, after igniting the first squib and at substantially a same time as each other in cases in which a head-on collision has occurred, and
      the third squib to ignite, after sequentially igniting the first squib and then the second squib and before inflation and deployment of the airbag is completed in cases in which an oblique collision or small overlap collision has occurred.

2. The vehicle front passenger seat airbag device of claim 1, wherein
   the plurality of inflators include a first inflator and a second inflator disposed side-by-side in the vehicle width direction,
   the first inflator is a dual-type inflator including the first squib and the third squib, and
   the second inflator is a single-type inflator including the second squib.

3. The vehicle front passenger seat airbag device of claim 1, wherein
   in a case in which a seat slide position of a seat cushion of the front passenger seat is positioned closer to the vehicle front side than a predetermined position in a vehicle length direction, the controller controls the timing for igniting each squib under a first control, and
   in a case in which the seat slide position of the seat cushion is positioned closer to the vehicle rear side than the predetermined position in the vehicle length direction, the controller controls the timing for igniting each squib under a second control different than the first control.

4. The vehicle front passenger seat airbag device of claim 1, wherein
   in a case in which a degree of severity of the collision is greater than a predetermined threshold value, the controller controls the timing for igniting each squib under a first control, and
   in a case in which the degree of severity of the collision is less than or equal to the predetermined threshold value, the controller controls the timing for igniting each squib under a second control different than the first control.

5. A vehicle front passenger seat airbag device comprising:
   a plurality of inflators each comprising a squib;
   an airbag including:
      a front passenger seat airbag that is inflated and deployed on receipt of gas supplied from the plurality of the inflators, and that is inflated and deployed at a vehicle front side of an occupant seated in a front passenger seat, and a center airbag that is inflated and deployed at a vehicle width direction center side of the front passenger seat airbag, and that includes a vehicle-rear-side end that projects out further toward a vehicle rear side when inflated and deployed than a rear end of the front passenger seat airbag when inflated and deployed; and a controller that controls timings for igniting each squib included in the plurality of inflators such that a peak internal pressure of the airbag inflated and deployed when an oblique collision or small overlap collision has occurred is delayed, compared to a peak internal pressure of the airbag inflated and deployed when a head-on collision has occurred, wherein the controller causes a timing for igniting at least one of the squibs ignited second or later out of the squibs included in the plurality of inflators to be delayed in cases in which an oblique collision or small overlap collision has occurred, compared to a timing for igniting the corresponding squib in cases in which a head-on collision has occurred;

the plurality of inflators include a first squib, a second squib, and a third squib; and the controller causes:

the second squib and the third squib to ignite, after igniting the first squib and at substantially a same time as each other in cases in which a head-on collision has occurred, and the third squib to ignite, after sequentially igniting the first squib and then the second squib and after inflation and deployment of the airbag is completed in cases in which an oblique collision or small overlap collision has occurred.

6. The vehicle front passenger seat airbag device of claim 5, wherein the plurality of inflators include a first inflator and a second inflator disposed side-by-side in the vehicle width direction, the first inflator is a dual-type inflator including the first squib and the third squib, and the second inflator is a single-type inflator including the second squib.

7. The vehicle front passenger seat airbag device of claim 5, wherein in a case in which a seat slide position of a seat cushion of the front passenger seat is positioned closer to the vehicle front side than a predetermined position in a vehicle length direction, the controller controls the timing for igniting each squib under a first control, and in a case in which the seat slide position of the seat cushion is positioned closer to the vehicle rear side than the predetermined position in the vehicle length direction, the controller controls the timing for igniting each squib under a second control different than the first control.

8. The vehicle front passenger seat airbag device of claim 5, wherein in a case in which a degree of severity of the collision is greater than a predetermined threshold value, the controller controls the timing for igniting each squib under a first control, and in a case in which the degree of severity of the collision is less than or equal to the predetermined threshold value, the controller controls the timing for igniting each squib under a second control different than the first control.

9. A vehicle front passenger seat airbag device comprising:

a plurality of inflators each comprising a squib;

an airbag including:

a front passenger seat airbag that is inflated and deployed on receipt of gas supplied from the plurality of the inflators, and that is inflated and deployed at a vehicle front side of an occupant seated in a front passenger seat, and a center airbag that is inflated and deployed at a vehicle width direction center side of the front passenger seat airbag, and that includes a vehicle-rear-side end that projects out further toward a vehicle rear side when inflated and deployed than a rear end of the front passenger seat airbag when inflated and deployed; and a controller that controls timings for igniting each squib included in the plurality of inflators such that a peak internal pressure of the airbag inflated and deployed when an oblique collision or small overlap collision has occurred is delayed, compared to a peak internal pressure of the airbag inflated and deployed when a head-on collision has occurred, wherein the controller causes a timing for igniting at least one of the squibs ignited second or later out of the squibs included in the plurality of inflators to be delayed in cases in which an oblique collision or small overlap collision has occurred, compared to a timing for igniting the corresponding squib in cases in which a head-on collision has occurred;

the plurality of inflators include a first squib, a second squib, and a third squib; and the controller in cases in which a head-on collision has occurred, causes the second squib and the third squib to ignite, after igniting the first squib and at substantially a same time as each other, and, in cases in which an oblique collision or small overlap collision has occurred, based on a front-rear position of the seat of the occupant or on a degree of severity of the collision, switches between first control, causing the third squib to ignite, after sequentially igniting the first squib and then the second squib and before inflation and deployment of the airbag is completed, and second control, causing the third squib to ignite, after sequentially igniting the first squib and then the second squib and after inflation and deployment of the airbag is completed.

10. The vehicle front passenger seat airbag device of claim 9, wherein the plurality of inflators include a first inflator and a second inflator disposed side-by-side in the vehicle width direction, the first inflator is a dual-type inflator including the first squib and the third squib, and the second inflator is a single-type inflator including the second squib.

11. The vehicle front passenger seat airbag device of claim 9, wherein in a case in which a seat slide position of a seat cushion of the front passenger seat is positioned closer to the vehicle front side than a predetermined position in a vehicle length direction, the controller controls the timing for igniting each squib under the first control, and in a case in which the seat slide position of the seat cushion is positioned closer to the vehicle rear side than the predetermined position in the vehicle length direction, the controller controls the timing for igniting each squib under the second control.

12. The vehicle front passenger seat airbag device of claim 9, wherein in a case in which the degree of severity of the collision is greater than a predetermined threshold value, the controller controls the timing for igniting each squib under the first control, and in a case in which the degree of severity of the collision is less than or equal to the predetermined threshold value, the controller controls the timing for igniting each squib under the second control.

* * * * *